(12) United States Patent
Tang et al.

(10) Patent No.: US 7,885,028 B2
(45) Date of Patent: Feb. 8, 2011

(54) DATA ERROR RECOVERY USING VOTING ON MULTIPLE RETRIALS

(75) Inventors: Yawshing Tang, Saratoga, CA (US); Carl Xiaodong Che, Saratoga, CA (US); Na-Young Kim, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 302 days.

(21) Appl. No.: 12/082,150

(22) Filed: Apr. 8, 2008

(65) Prior Publication Data

US 2009/0251817 A1    Oct. 8, 2009

(51) Int. Cl.
G11B 5/09 (2006.01)
G11B 27/36 (2006.01)
G11B 5/03 (2006.01)
(52) U.S. Cl. .............................. 360/53; 360/31; 360/66
(58) Field of Classification Search .................. 360/53, 360/66; 714/760, 769
See application file for complete search history.

(56) References Cited

U.S. PATENT DOCUMENTS

| | | | | |
|---|---|---|---|---|
| 6,981,205 B2 * | 12/2005 | Fukushima et al. | ......... | 714/797 |
| 7,215,497 B2 * | 5/2007 | Urata | ........................ | 360/53 |
| 7,317,761 B2 * | 1/2008 | Lozhkin | ..................... | 375/260 |
| 7,430,705 B2 * | 9/2008 | Uchida | ....................... | 714/794 |
| 7,634,706 B1 * | 12/2009 | Chen et al. | .................. | 714/760 |

OTHER PUBLICATIONS

Stephen B. Vardeman, "Statistics for Engineering Problem Solving", 1994, PWS Publishing Company.*

* cited by examiner

*Primary Examiner*—Daniell L Negrón
*Assistant Examiner*—Regina N Holder
(74) *Attorney, Agent, or Firm*—Ben J. Yorks; Irell & Manella LLP

(57) ABSTRACT

A hard disk drive with a disk that has a plurality of data bits. The drive includes a circuit that reads each data bit n times and selects a value for the bit based on the most frequent occurrence of one of a plurality of values. This process provides a voting technique that enhances the quality of accurately captured data.

6 Claims, 3 Drawing Sheets

DATA ERROR RECOVERY USING VOTING ON MULTIPLE RETRIALS

BACKGROUND OF THE INVENTION

1. Field of the Invention

The present invention relates to a technique for reading data from a disk of a hard disk drive.

2. Background Information

Hard disk drives contain a plurality of magnetic heads that are coupled to rotating disks. The heads can magnetize and sense the magnetic fields of the disks to write and read data, respectively. The heads are coupled to a pivoting actuator arm that has a voice coil motor.

Data is typically stored on tracks that extend radially across the disk surfaces. The voice coil motor can be energized to pivot the actuator arm and move the heads to different track locations. Each track is typically divided into a number of sectors. Each sector contains at least one data field.

Data is read from the disks in accordance with a read operation controlled by the disk drive controller. The read operation typically includes enabling a read gate of a read channel. Enabling the read gate causes the heads to sense the magnetic fields of the disks. If the drive is unsuccessful in reading the data, the controller will retry the read operation in accordance with a retry step from a retry look-up table. The retry look-up table typically contains a sequence of retry steps. Each retry step may utilize different head parameters. For example, the read current and cut-off frequency of the head may be changed for each step.

The disk drive will continue to retry the read operations in accordance with the retry steps until data is successfully read from the disk, or the drive has tried all of the retry steps in the table. The retry technique does not always insure a successful read of data. It would be desirable to improve the quality of the retry technique to capture accurate data.

BRIEF SUMMARY OF THE INVENTION

A hard disk drive with a disk that has a plurality of data bits. The drive includes a circuit that reads each data bit n times and selects a value for the bit based on the most frequent occurrence of one of a plurality of values.

DETAILED DESCRIPTION

Disclosed is a hard disk drive with a disk that has a plurality of data bits. The drive includes a circuit that reads each data bit n times and selects a value for the bit based on the most frequent occurrence of one of a plurality of values. This process provides a voting technique that enhances the quality of accurately captured data.

Figure 1:
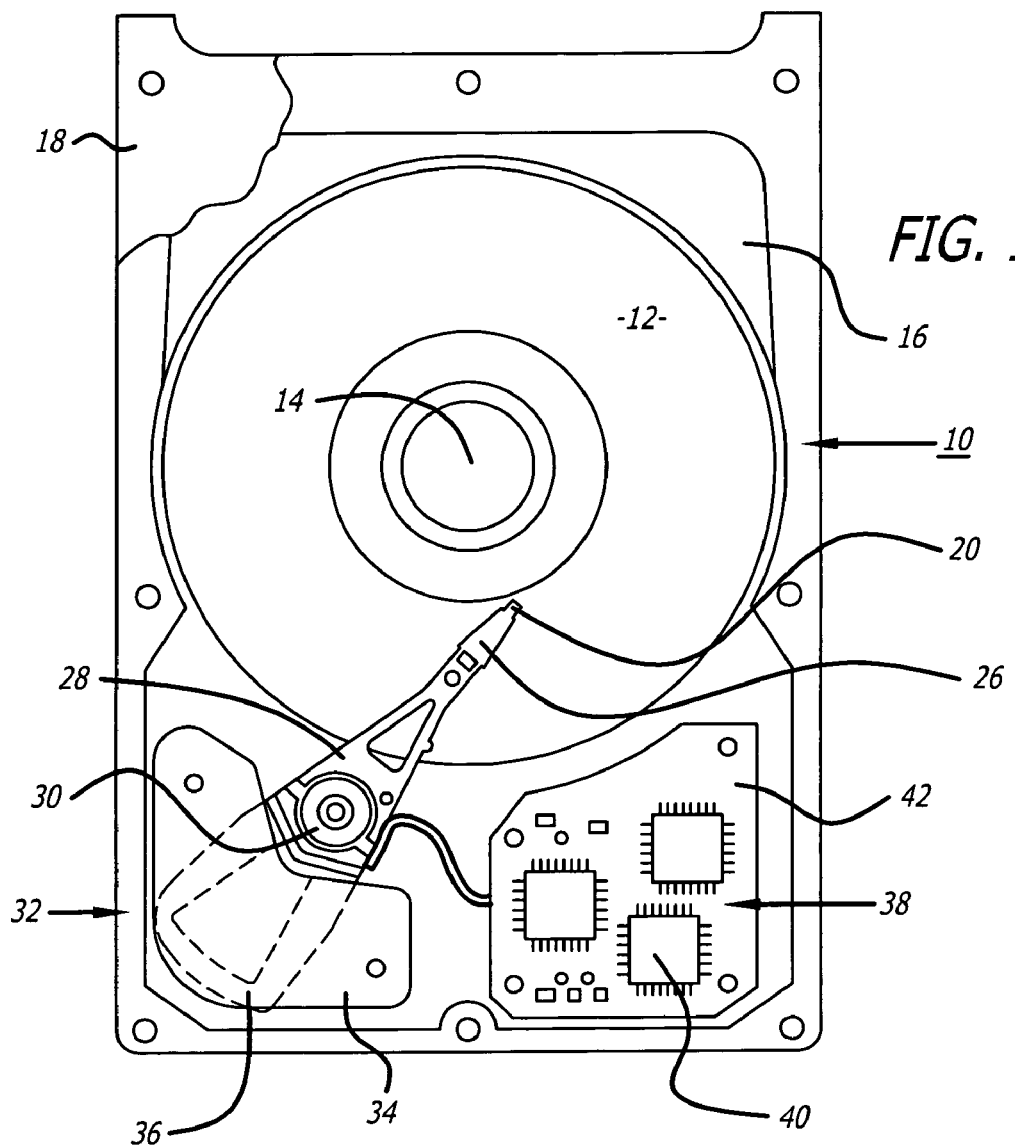
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 2:
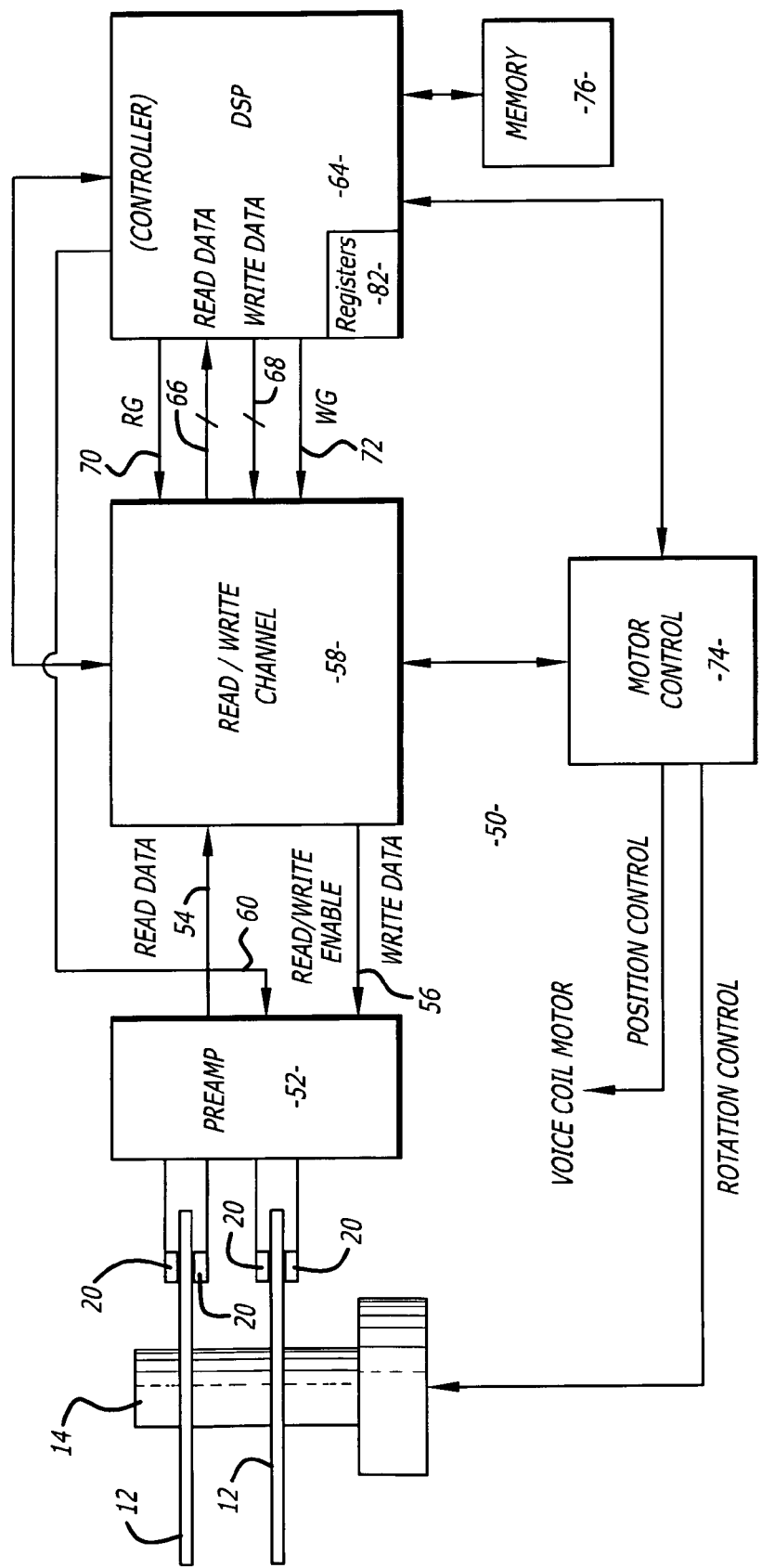
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a firmware and/or software routine(s), including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. The memory 76 may contain the firmware and/or software routine(s) performed by the controller 64.

Memory 76 and/or disk 12 may contain a retry look-up table that has a plurality of retry steps. The retry steps are performed to read data from the disk.

Figure 3:
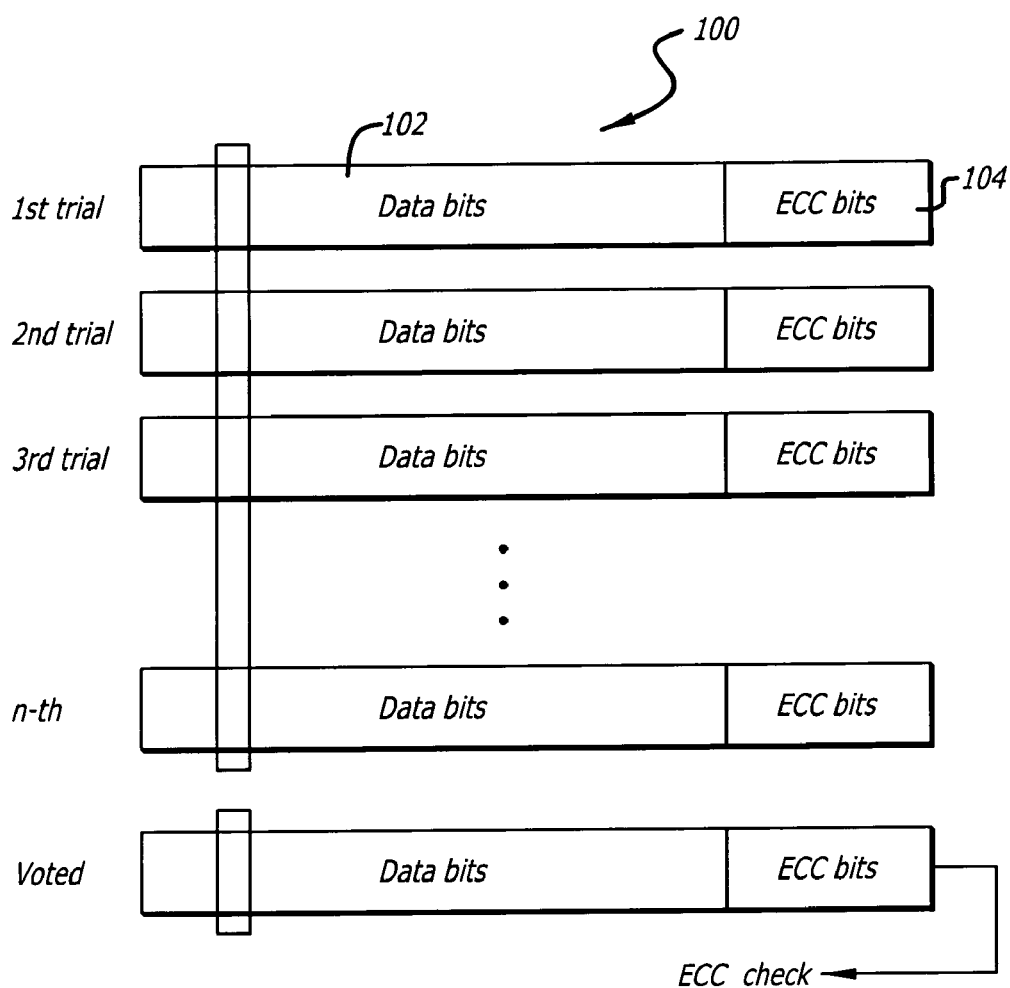
FIG. 3 is an illustration showing a sector of a disk track being read n times.

FIG. 3 is an illustration showing a track sector 100 being read n times. The track sector 100 includes a data section 102 and an error correction code ("ECC") section 104. Each section 102 and 104 includes a plurality of data bits. The data bits may have a value of 0 or a value of 1.

The controller will cause a reading of each bit n times. The controller then selects the most frequently occurring value as the value for each bit. For example, if after n reading of a bit there were more 0s than 1s then the bit will be set as a 0. Conversely, if there were more 1s than 0s then the bit is set as a 1. It is preferable to select n as an odd number to avoid the occurrence of an equal number of 1s and 0s. This technique can be used to select the value of all the bits in both the data 102 and ECC 104 sections. After each bit is selected, conventional error correction routines using the bits selected in the ECC section 104 can be employed to recover the data read from the disk.

The disk is typically organized into a plurality of adjacent tracks. To reduce adjacent track interference the adjacent track(s) can be erased before each reading of a track. The data from the adjacent tracks is stored in memory before erasure and then rewritten to avoid a loss of data. The read channel parameters may also be changed after each read cycle. This technique can be repeated multiple times and the result of each detected data bit can be voted to reduce the erasure noise.

Probability equations may be utilized, particularly if there is an unequal probability of the occurrence of a 1 or a 0. For example, the following two probability equations may be utilized:

$$p(0) = \frac{m}{m+n}p(0|0) + \frac{n}{m+n}p(0|1) \quad (1)$$

$$p(1) = \frac{m}{m+n}p(1|0) + \frac{n}{m+n}p(1|1) \quad (2)$$

where;
m=the number of times a 0 is detected.
n=the number of times a 1 is detected.
p(0)=the probability that the bit is a 0.
p(1)=the probability that the bit is a 1.
p(0|0)=the probability that the bit is a 0 when a 0 is detected.
p(0|1)=the probability that the bit is a 0 when a 1 is detected.
p(1|0)=the probability that the bit is a 1 when a 0 is detected.
p(1|1)=the probability that the bit is a 1 when a 1 is detected.

The bit can be selected based on the highest value between p(0) and p(1). For example, if p(0) is higher than p(1), then the bit is set as a 0, and vice versa.

When p(0|1) and p(1|0) are equal then P(0|0) and p(1|1) are also equal and the equations can be rewritten as:

$$p(0) - p(1) = \frac{m-n}{m+n}(p(0|0) - p(0|1)) \quad (3)$$

If p(0)−p(1) is a positive number then the bit is set to a 0, if the difference is a negative number then the difference is set to a 1.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
a disk that includes a plurality of data bits;
a spindle motor that rotates said disk;
a head coupled to said disk;
an actuator arm coupled to said head;
a voice coil motor coupled to said actuator arm; and,
a circuit that reads each data bit [n] a plurality of times and selects a value for the bit based on the most frequent occurrence of one of a plurality of values and a difference between a probability of a one and a probability of a zero, said probability of one and said probability of zero having the form:

$$p(0) = \frac{m}{m+n}p(0|0) + \frac{n}{m+n}p(0|1)$$

$$p(1) = \frac{m}{m+n}p(1|0) + \frac{n}{m+n}p(1|1)$$

where;
m=the number of times a 0 is detected;
n=the number of times a 1 is detected;
p(0)=the probability that the bit is a 0;
p(1)=the probability that the bit is a 1;
p(0|0)=the probability that the bit is a 0 when a 0 is detected;
p(0|1)=the probability that the bit is a 0 when a 1 is detected;
p(1|0)=the probability that the bit is a 1 when a 0 is detected;
p(1|1)=the probability that the bit is a 1 when a 1 is detected.

2. The disk drive of claim 1, wherein said disk includes a plurality of adjacent tracks, and said circuit causes an erasure of an adjacent track before each reading of said bit.

3. A hard disk drive, comprising:
a disk that has a plurality of data bits;
a spindle motor that rotates said disk;
a head coupled to said disk;
an actuator arm coupled to said head;
a voice coil motor coupled to said actuator arm;
error correction means for reading each data bit [n] a plurality of times and selecting a value for the bit based on the most frequent occurrence of one of a plurality of values and a difference between a probability of a one and a probability of a zero, said probability of one and said probability of zero having the form:

$$p(0) = \frac{m}{m+n}p(0|0) + \frac{n}{m+n}p(0|1)$$

$$p(1) = \frac{m}{m+n}p(1|0) + \frac{n}{m+n}p(1|1)$$

where;
m=the number of times a 0 is detected;
n=the number of times a 1 is detected;
p(0)=the probability that the bit is a 0;
p(1)=the probability that the bit is a 1;
p(0|0)=the probability that the bit is a 0 when a 0 is detected;
p(0|1)=the probability that the bit is a 0 when a 1 is detected;
p(1|0)=the probability that the bit is a 1 when a 0 is detected;
p(1|1)=the probability that the bit is a 1 when a 1 is detected.

4. The disk drive of claim 3, wherein said disk includes a plurality of adjacent tracks, and said error correction means causes an erasure of an adjacent track before each reading of said bit.

5. A method for reading data from a disk of a hard disk drive, comprising:
reading a bit a plurality of times;
determining a most frequent occurrence of a value of the bit from a plurality of values and a difference between a probability of a one and a probability of a zero, said probability of one and said probability of zero having the form:

$$p(0) = \frac{m}{m+n}p(0|0) + \frac{n}{m+n}p(0|1)$$

$$p(1) = \frac{m}{m+n}p(1|0) + \frac{n}{m+n}p(1|1)$$

where;
m=the number of times a 0 is detected;
n=the number of times a 1 is detected;
p(0)=the probability that the bit is a 0;
p(1)=the probability that the bit is a 1;
p(0|0)=the probability that the bit is a 0 when a 0 is detected;
p(0|1)=the probability that the bit is a 0 when a 1 is detected;
p(1|0)=the probability that the bit is a 1 when a 0 is detected;
p(1|1)=the probability that the bit is a 1 when a 1 is detected; and,
selecting the most frequently occurring value as the value of the bit.

6. The method of claim 5, further comprising erasing an adjacent track before each reading of the bit.

\* \* \* \* \*